United States Patent [19]
Kikuchi et al.

[11] Patent Number: 5,495,314
[45] Date of Patent: Feb. 27, 1996

[54] IMAGE FORMING APPARATUS CONTROLLED BY MICROCOMPUTER

[75] Inventors: Naoyuki Kikuchi, Ohgaki; Nobuhiro Mabuchi, Hashima, both of Japan

[73] Assignee: Sanyo Electric Co., Ltd., Moriguchi, Japan

[21] Appl. No.: 129,852

[22] Filed: Sep. 30, 1993

[30] Foreign Application Priority Data

Sep. 30, 1992 [JP] Japan ................... 4-262171

[51] Int. Cl.⁶ .................................. G03G 21/00
[52] U.S. Cl. ......................... 355/204; 355/206; 371/62
[58] Field of Search ..................... 355/203, 206, 355/207, 209, 204; 371/14, 15.1, 29.1, 16.3, 62, 7

[56] References Cited

U.S. PATENT DOCUMENTS

| | | | |
|---|---|---|---|
| 4,452,525 | 6/1984 | Ogura | 355/206 |
| 4,569,585 | 2/1986 | Masuda | 355/206 |
| 4,758,860 | 7/1988 | Takayanagi et al. | 355/206 |
| 4,926,310 | 5/1990 | Inuzuka et al. | 364/186 |
| 4,994,852 | 2/1991 | Matsuuchi et al. | 355/206 |
| 5,049,938 | 9/1991 | Ueda | 355/246 |
| 5,068,853 | 11/1991 | Soma et al. | 371/16.3 |
| 5,107,294 | 4/1992 | Akao | 355/326 M |
| 5,164,770 | 11/1992 | Furuichi et al. | 355/206 |
| 5,239,384 | 8/1993 | Takei et al. | 358/335 |

Primary Examiner—A. T. Grimley
Assistant Examiner—Thu Dang
Attorney, Agent, or Firm—Darby & Darby

[57] ABSTRACT

An image forming apparatus includes a microcomputer which controls components for executing an image forming operation, and sends a signal to a supervising portion when no abnormality occurs in itself. The supervising portion includes a watch-dog timer, and sends a reset signal to the microcomputer when the signal from the microcomputer is not continuously inputted for a predetermined time period or more. Accordingly, the microcomputer becomes in a reset state, and the image forming operation is stopped. A flag is not set until a predetermined time period elapses from a time that the reset signal is inputted, and therefore, the image forming operation is inhibited for the predetermined time period.

6 Claims, 6 Drawing Sheets

F I G. 1
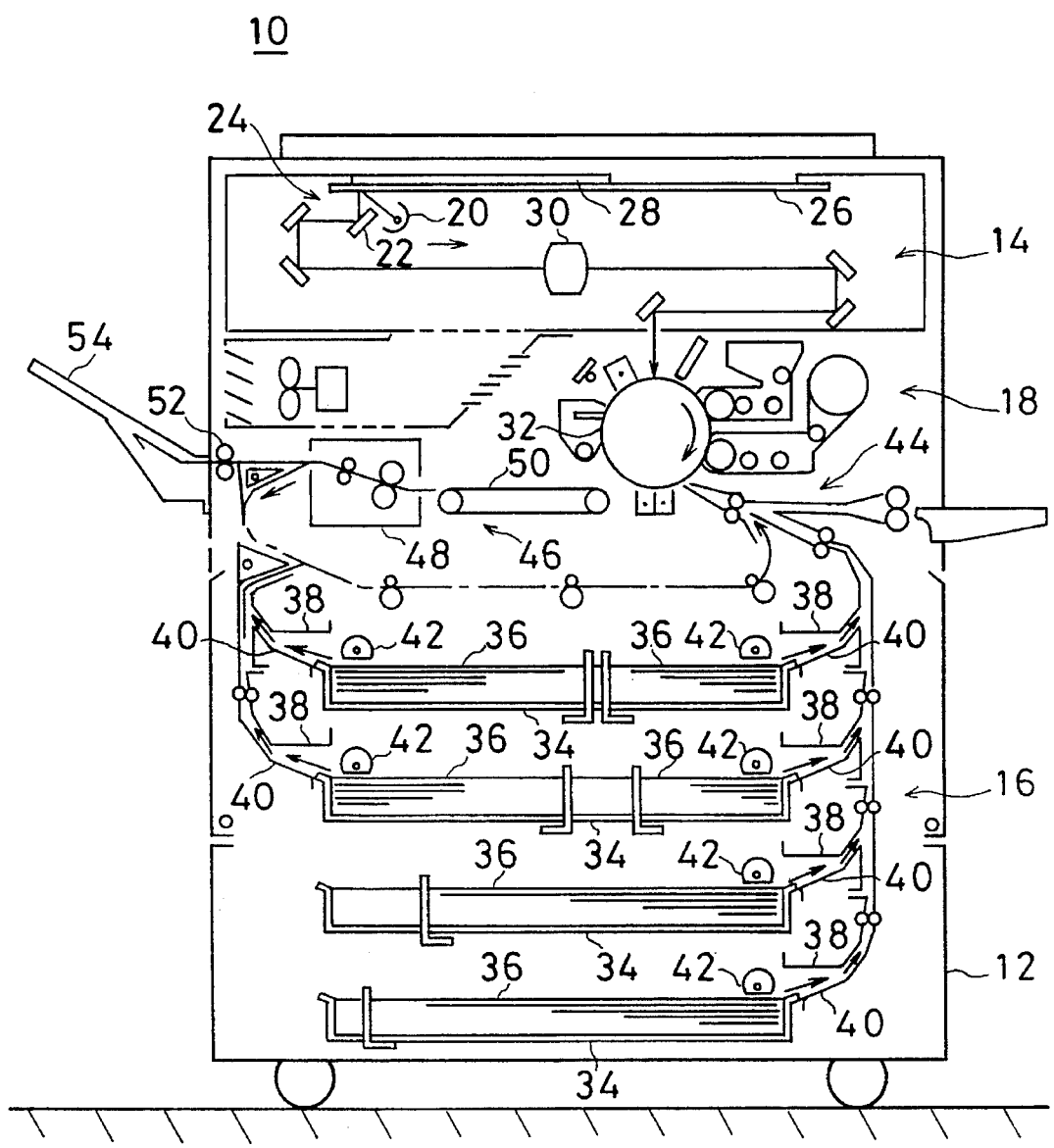

F I G. 2
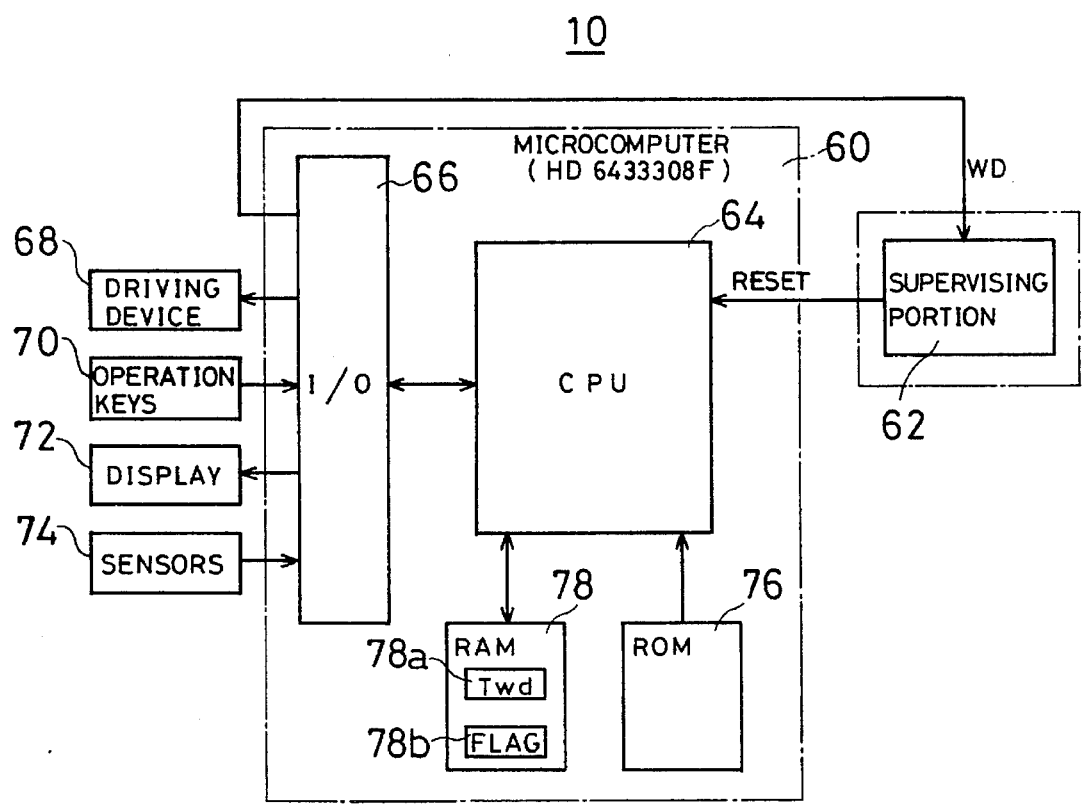

IMAGE FORMING APPARATUS CONTROLLED BY MICROCOMPUTER

BACKGROUND OF THE INVENTION

1. Field of the Invention

The present invention relates to an image forming apparatus. More specifically, the present invention relates to an image forming apparatus such as a copying machine, printer, facsimile and etc., in which components such as a motor, light source and etc. for executing an image forming operation are controlled by a microcomputer.

2. Description of the Prior Art

In such a kind of image forming apparatus, if and when a specific signal indicative of a normal operation is not periodically outputted from a microcomputer to a supervising portion for some reason, the supervising portion continuously applies a reset signal to the microcomputer at intervals. Therefore, in a case where the image forming operation is started just after the microcomputer is reset, for example, the image forming operation is intermittently executed if the reset signal is repeatedly inputted to the microcomputer at short intervals.

In a case of a copying machine, for example, a scanning unit for exposing an original is moved to a home position when a power switch is turned-on, and when a start key is depressed, the scanning unit is started to move from the home position. However, in a case of a copying machine in which the scanning unit is moved to the home position just after the turning-on of the power switch, the scanning unit repeats the movement and the stop alternately if the supervising portion continuously outputs the reset signal at short intervals due to an abnormality of the microcomputer, and therefore, there is the possibility of a failure of the scanning unit.

SUMMARY OF THE INVENTION

Therefore, a principal object of the present invention is to provide a novel image forming apparatus.

Another object of the present invention is to provide an image forming apparatus in which no failure of components for executing an image forming operation occurs even if an abnormality occurs in a microcomputer.

Another object of the present invention is to provide an image forming apparatus in which the image forming operation can be surely inhibited when an abnormality occurs in a microcomputer.

An image forming apparatus according to the present invention comprises: a component for executing an image forming operation; control means for controlling the component, the control means outputting a predetermined signal when no abnormality occurs in the control means; a supervising means which receives the predetermined signal, the supervising means outputting a disable signal when the predetermined signal is not continuously inputted for a first predetermined time period; and inhibiting means for inhibiting the image forming operation from being executed in response to the disable signal for a second predetermined time period.

When the predetermined signal is not continuously inputted from the control means to the supervising means for the first predetermined time period or more, the supervising means outputs the disable signal. The control means receives the disable signal, and disables the component. The inhibiting means inhibits the image forming operation from being executed such that a state where the component is disabled continues for the second predetermined time period.

In an embodiment, the control means includes a microcomputer, and the supervising means includes a timer called as a watch-dog timer. In such an embodiment, when a predetermined signal (WD) is outputted from the microcomputer, the watch-dog timer is reset. If the predetermined signal is not continuously inputted to the watch-dog timer for the first predetermined time period or more, the watch-dog timer outputs the disable signal, i.e. a reset signal to the microcomputer. When the reset signal is inputted to the microcomputer, the microcomputer does not set a flag until the second predetermined time period (Twd) elapses. After the flag is set, the image forming operation can be executed. Therefore, after the reset signal is inputted, a disabled state is continued for the second predetermined time period (Twd). In other words, after the reset signal is outputted, the image forming operation is inhibited for the second predetermined time period (Twd) by the inhibiting means.

In accordance with the present invention, if any abnormality occurs in the control means (microcomputer, for example), a disable signal is outputted from the supervising means (watch-dog timer, for example), and therefore, the image forming operation is stopped. Thereafter, since the disabled state continues until the second predetermined time period elapses, even if the disable signal has not been outputted from the supervising means, the image forming operation is not restarted immediately. Therefore, it is possible to prevent the intermittent operation of the component for executing the image forming operation, and therefore, no disadvantage that a failure of the component occurs.

The above described objects and other objects, features, aspects and advantages of the present invention will become more apparent from the following detailed description of the present invention when taken in conjunction with the accompanying drawings.

BRIEF DESCRIPTION OF THE DRAWINGS

FIG. 1 is an illustrative view showing a copying machine that is one embodiment according to the present invention;

FIG. 2 is a block diagram showing the embodiment;

DETAILED DESCRIPTION OF THE PREFERRED EMBODIMENTS

Figure 3A:
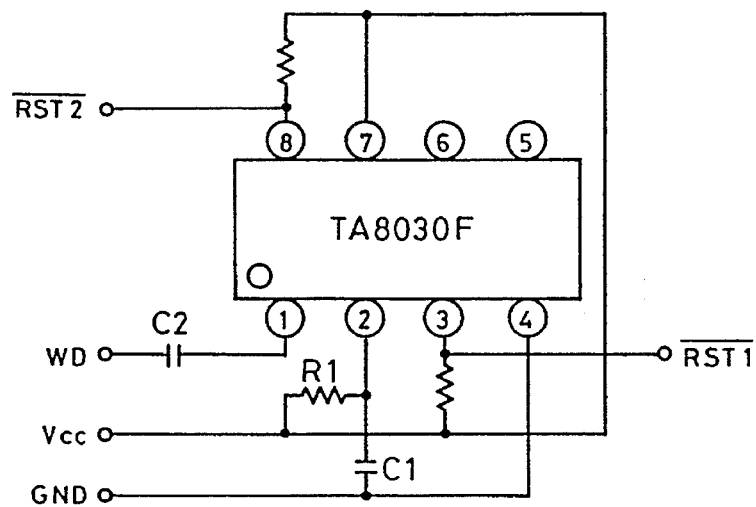
FIG. 3 is a block diagram showing one example of a supervising portion shown in FIG. 2.

FIG. 1 is an illustrative view showing a copying machine 10 that is one embodiment according to the present invention. However, it is pointed-out in advance that the present invention can be applied to an arbitrary image forming apparatus such as a facsimile, printer, and etc. other than a copying machine.

With referring to FIG. 1, the copying machine 10 includes a housing 12, and inside the housing 12, the scanning section 14 and a paper feeding section 16 are formed at an upper portion and a lower portion, respectively, and an image forming section 18 is formed between the both sections 14 and 16.

The scanning section 14 includes a scanning unit 24 which includes a light source 20 and a plurality of reflecting mirrors 22. When a start key (not shown) included in operation keys 70 (described later) is depressed, the scanning unit 24 is moved from a home position (HP) along an original table 26 which is bridged on an upper surface of the housing 12 and made of a glass. Then, a reflected light from an original 28 put on the original table 26 is collected by the plurality of reflecting mirrors 22 and a lens 30 so as to be irradiated onto a photosensitive drum 32 disposed at an approximately center portion of the image forming section 18.

The paper feeding section 16 includes a plurality of paper feeding cassettes 34 arranged in a height direction of the copying machine 10, and papers 36 are stored at a side or both sides of respective paper feeding cassettes 34. At the side or the both sides of the respective paper feeding cassettes 34, that is, at the side or side at which the papers are stored, pairs of guide plates 38 and 40 are arranged, respectively. Furthermore, feeding rollers 42 are arranged above papers 36 and in the vicinity of the guide plates 38 and 40. Then, the paper 36 stored in each of the paper feeding cassettes 34 is sequentially fed one by one by each of the feeding rollers 42, and led upward through a gap between the guide plates 38 and 40, and then, applied to the photosensitive drum 32 through a paper feeding path 44 formed at a side (a right side in FIG. 1) of the image forming section 18.

The image forming section 18 includes the photosensitive drum 32, the paper feeding path 44, a paper discharging path 46 and a fixing unit 48 arranged in a midway of the paper discharging path 46, and etc. The photosensitive drum 32 is rotated in a clockwise direction in FIG. 1, and an electrostatic latent image is formed on an outer peripheral surface of the photosensitive drum 32 by the light irradiated from the scanning section 14. Then, after the electrostatic latent image is toner-developed, a toner image is transferred onto the paper 36. The paper 36 on which the toner image has been transferred is led to the fixing unit 48 by a feeding unit 50 arranged along the paper discharging path 46. In the fixing unit 48, the toner image transferred onto the paper 36 is melted and fixed to the paper 36. The paper 36 withdrawn from the fixing unit 48 is discharged to a paper discharging table 54 which is attached an outside of the housing 12 by a paper discharging roller 52 which is arranged at an end of the paper discharging path 46.

Figure 4:
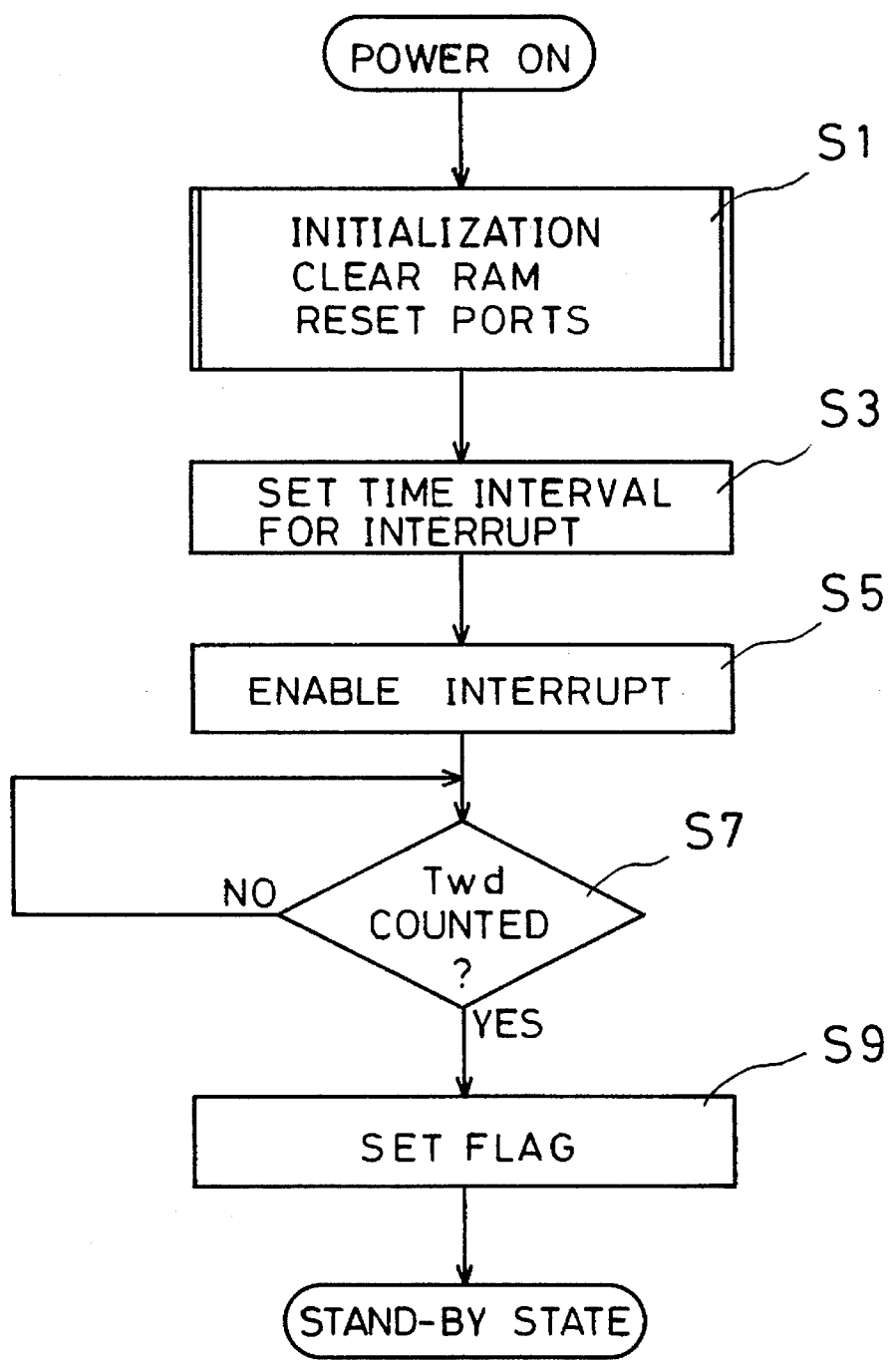
FIG. 4 is a flowchart showing an operation of the embodiment.
Figure 5:
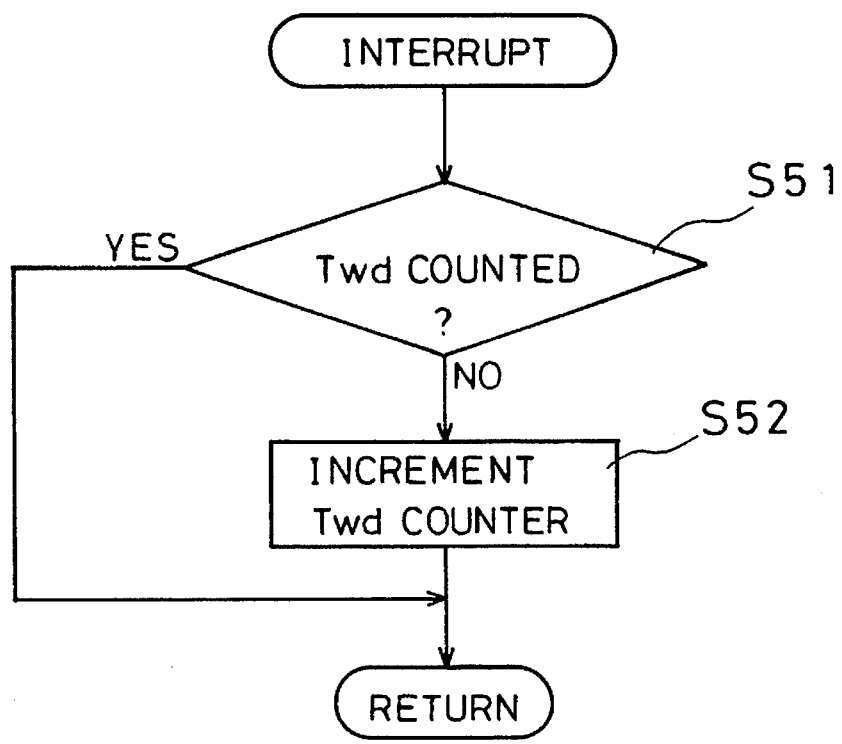
FIG. 5 is a flowchart showing an interrupt routine.
Figure 6:
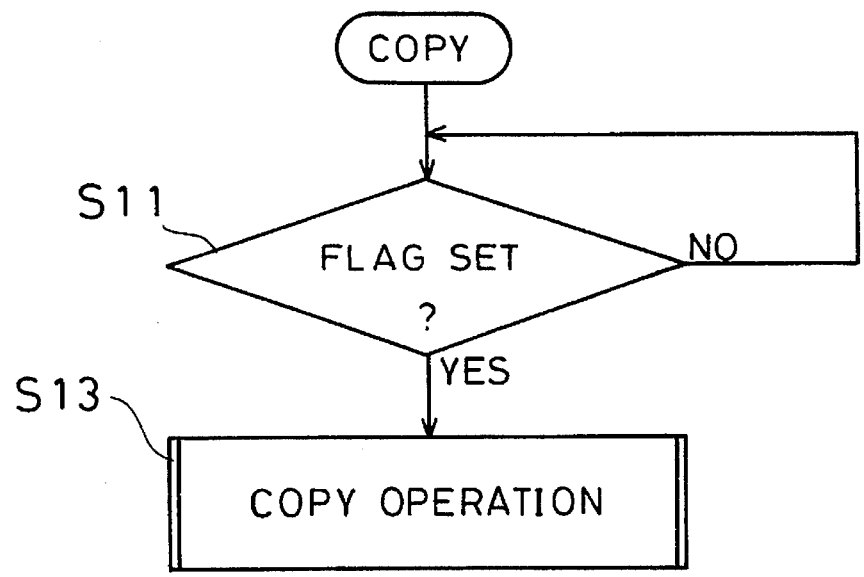
FIG. 6 is a flowchart showing a copying operation.

A block diagram of such the copying machine 10 is shown in FIG. 2. The copying machine 10 includes a microcomputer 60 and a supervising portion 62 for supervising a status of the microcomputer 60. The microcomputer 60 includes a CPU 64 to which an input/output interface (I/O) 66 is connected. Through the I/O interface 66, a driving device 68 which includes a motor and etc. for driving the scanning unit 24, the photosensitive drum 32, the feeding rollers 42 (FIG. 1) and etc., the operation keys 70 which include the start key and are utilized for entering a copy magnification, copy quantity and etc., a display 72 which displays the copy magnification, the copy quantity and etc., and various sensors 74 which sense or detect an original density, an original size, a position of the scanning unit 24 and etc. are connected to the microcomputer 60. Therefore, signals can be transmitted or received between each of the driving device 68, the operation keys 70, the display 72 and the sensors 74, and the CPU 64. Furthermore, a ROM 76 in which various programs including flowcharts shown in FIG. 4 to FIG. 6 are stored, and a RAM 78 in which data are written are connected to the CPU 64. In the RAM 78, a Twd counter 78a for counting a predetermined time period (Twd: described later), and a flag area 78b for a flag (described later) are assigned.

In addition, as the microcomputer 60, a one-chip microcomputer "HD6433308F" manufactured by Hitachi, for example, can be utilized, and as the supervising portion 62, an integrated circuit "TA8030F" manufactured by Toshiba, for example, can be utilized.

Figure 3B:
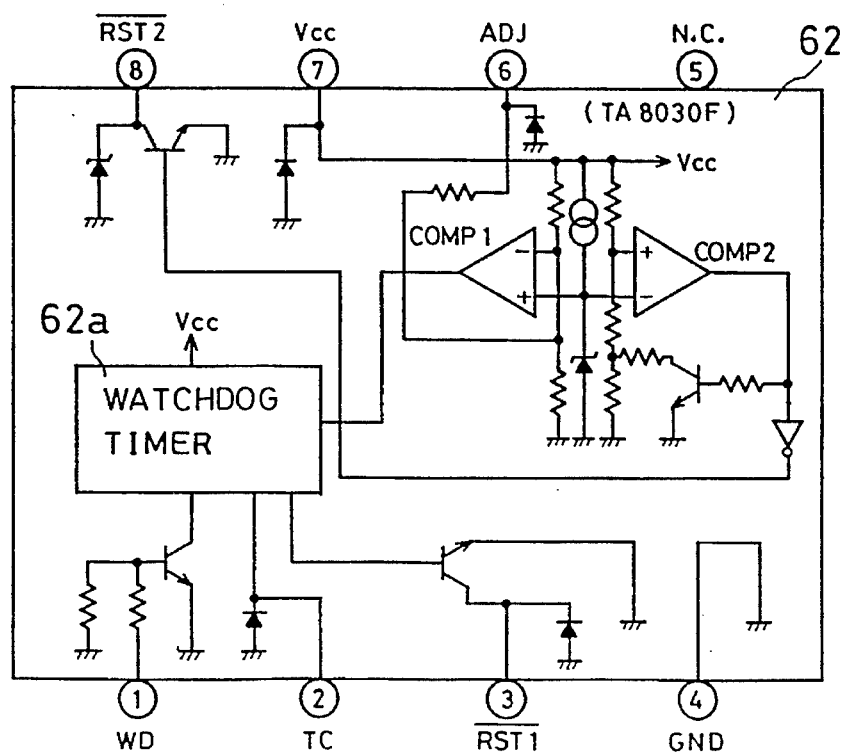
Figure 7:
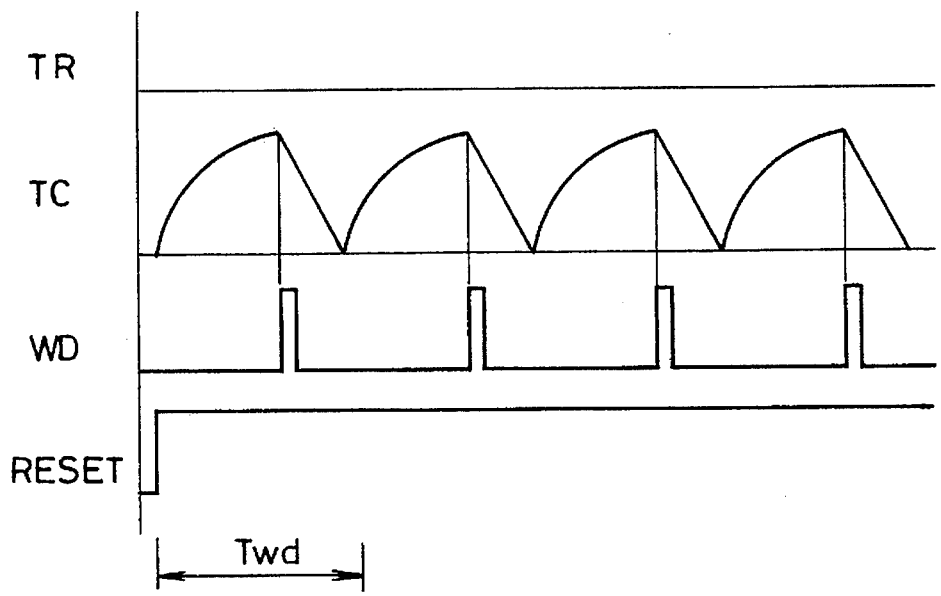
FIG. 7 is a timing chart showing an operation of a case where no abnormality occurs in a microcomputer.
Figure 8:
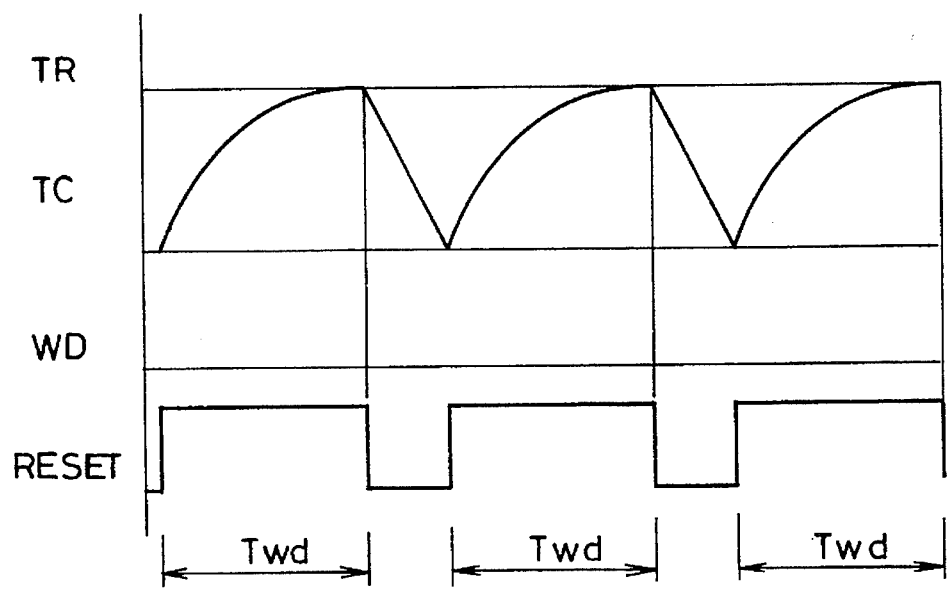
FIG. 8 is a timing chart showing an operation of a case where an abnormality occurs in the microcomputer.

Then, the microcomputer 60 applies a signal WD representing that no abnormality occurs in the microcomputer 60 to the supervising portion 62. The supervising portion 62 is structured as shown in FIG. 3, for example, and receives the signal WD to a first terminal ① via a capacitor C2. The supervising portion 62 includes a watch-dog timer 62a which receives the signal WD, and the supervising portion 62 intermittently or periodically outputs a reset signal in accordance with a time constant determined by a capacitor C1 and a resistor R1 when the signal WD is not inputted to the first terminal ①. The reset signal is outputted from a third terminal ③. More specifically, the capacitor C1 is charged by a voltage Vcc, and when the signal WD is inputted to the first terminal ①, the capacitor C1 is reset (discharged) at that timing. When a charged voltage of the capacitor C1 exceeds a predetermined threshold level (TR: FIG. 7 and FIG. 8) after no signal WD becomes to be inputted, the above described reset signal is outputted. Then, the reset signal outputted from the third terminal ③ is applied to the microcomputer 60 as a reset signal RESET (FIG. 1) therefor. Therefore, when an abnormality occurs in the microcomputer 60, the microcomputer 60 receives the reset signal from the supervising portion 62.

According to the flowcharts shown in FIG. 4 to FIG. 6, an operation of this embodiment shown will be described.

When a power switch of the copying machine 10 is turned-on, an initializing operation is executed in a step S1. That is, the RAM 78 (FIG. 1) is cleared, and the I/O ports are reset. Then, in a step S3, a time interval for an interrupt is set. Therefore, if the interrupt is enabled in a step S5, an interrupt routine shown in FIG. 5 is executed at the time intervals. More specifically, in a step S51 shown in FIG. 5, the microcomputer 60 determines whether or not the predetermined time period (Twd) is counted. If the predetermined time period (Twd) does not elapse, the Twd counter 78a (FIG. 1) is incremented (step S52), and thereafter, the process returns to the main routine shown in FIG. 4. If the predetermined time period (Twd) is counted, the process returns to the main routine as it is.

Therefore, a step S7 of FIG. 4 is executed, and in the step S7, the microcomputer 60 determines whether or not the predetermined time period (Twd) is counted by the Twd counter 78a. Then, if it is determined that the predetermined time period (Twd) elapsed by the Twd counter 78a, in a succeeding step S9, the flag area 78b (FIG. 1) is set, and therefore, a stand-by state is established.

Then, in a copy routine shown in FIG. 6, in a first step S11, it is determined whether or not the above described flag is set. When the flag is set, in a next step S13, a copying operation can be executed; however, if the flag is not set, that is, the flag is reset, the execution of the step S13 is inhibited until the flag is set.

In a case where no abnormality occurs in the microcomputer 60, as shown in FIG. 7, the signal WD is outputted from the microcomputer 60 to the supervising portion 62, and therefore, the capacitor C1 (FIG. 3) of the supervising portion 62 is reset at an interval of the signal WD that is set to be shorter than the predetermined time period (Twd), and therefore, the reset signal RESET is not outputted from the supervising portion 62 to the microcomputer 60. Therefore, in this case, "YES" is determined in the step S7 (FIG. 4), and the flag of the flag area 78b (FIG. 1) is set.

In a case where some abnormality occurs in the microcomputer 60, as shown in FIG. 8, the signal WD is not outputted from the microcomputer 60. Therefore, the capacitor C1 (FIG. 3) of the supervising portion 62 is not reset, the voltage of the capacitor C1 reaches the threshold value TR. Therefore, the reset signal RESET is outputted from the third terminal ③ of the supervising portion 62 to be inputted to the microcomputer 60. In response to the reset signal RESET, the microcomputer 60 is reset. That is, as similar to a power-on reset shown in the step S1 of FIG. 4, the RAM 78 is cleared and the I/O ports are reset. Therefore, the Twd counter 78a within the RAM 78 is cleared, and the flag area 78b within the RAM 78 is reset. Therefore, in this case, "NO" is determined in the step S11 of FIG. 6, it becomes impossible to execute the copying operation.

Thereafter, the interrupt routine shown in FIG. 5 is executed, and when the predetermined time period (Twd) elapsed, "YES" is determined in the step S7. Therefore, in the step S9, the flag is set, so that it becomes possible to execute the copying operation of the step S13 in FIG. 6. In other words, until the predetermined time period (Twd) elapses after the reset signal RESET is inputted from the supervising portion 62 to the microcomputer 60 as described above, the copying operation is inhibited. Therefore, the driving device 68 is not activated just after the microcomputer 60 is reset.

In addition, since the supervising portion 62 continuously operates during a time that a sequence of the copying operations are executed in the step S13 (FIG. 6), the abnormality of the microcomputer 60 can be supervised always. Therefore, if some abnormality occurs in the microcomputer 60 in executing a sequence of copying operations, the reset signal RESET is outputted from the supervising portion 62 to the microcomputer 60, and therefore, the copying operation is stopped as described above.

In addition, in the above described embodiment, an analog type of a watch-dog timer is utilized in the supervising portion 62. However, a digital type of a watch-dog timer may be utilized for the supervising portion 62. In this case, a counter which is incremented in response to a predetermined clock and reset in response to the signal WD can be utilized. If no signal WD is inputted, a predetermined value is counted by the counter, and therefore, the reset signal RESET is outputted.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An image forming apparatus, comprising:

a component for executing an image forming operation;

control means for controlling said component, said control means periodically outputting a predetermined signal when normally operating;

supervising means for receiving said predetermined signal, said supervising means outputting a disable signal when said predetermined signal is not inputted for a first predetermined time, said supervising means counting a time period associated with said first predetermined time period, and being reset each time that said predetermined signal is inputted thereto, thereby to output said disable signal when said predetermined signal is not inputted within said first predetermined time period, and inhibiting means for inhibiting an operation of said component in response to said disable signal for a second predetermined time period, said inhibiting means including means for permitting said component to execute its operation in response to said predetermined signal from said control means after said second predetermined time period.

2. An image forming apparatus according to claim 1, wherein said supervising means includes a watch-dog timer which is reset each time said supervising means receives said predetermined signal.

3. An image forming apparatus according to claim 1, wherein said control means outputs said predetermined signal with a time interval of said first predetermined time period when operating normally, said first predetermined time period being shorter than said second predetermined time period.

4. An image forming apparatus comprising:

a component for executing an image forming operation;

control means for controlling said component, said control means periodically outputting a predetermined signal when normally operating;

supervising means for receiving said predetermined signal, said supervising means outputting a disable signal when said predetermined signal is not inputted for a first predetermined time; and inhibiting means for inhibiting an operation of said component in response to said disable signal for a second predetermined time period, said inhibiting means including means for permitting said component to execute its operation in response to said predetermined signal from said control means after said second predetermined time period said control means including a microcomputer, and said disable signal being a reset signal for resetting said microcomputer, and said microcomputer assuming a reset state when said reset signal is applied thereto.

5. An image forming apparatus according to claim 4, wherein said inhibiting means includes flag means that is reset in a reset state of said microcomputer and set after said second predetermined time period has elapsed.

6. An abnormality supervising method of an image forming apparatus in which a component for executing an image forming operation is controlled by a control portion, comprising the steps of:

(a) outputting a specific signal from said control portion to a supervising portion when no abnormality occurs in said control portion;

(b) counting in the supervising portion a time period associated with a first predetermined time period;

(c) resetting the count each time that said specific signal is input to said supervising portion;

(d) outputting a disable signal from said supervising portion to said control portion when said specific signal is not inputted within said first predetermined time period;

(e) inhibiting an operation of said component for a second predetermined time period after said disable signal is inputted to said control portion; and (f) permitting said component to execute its operation in response to said specific signal from said control portion after said predetermined time period.

\* \* \* \* \*